Nov. 26, 1935.　　　J. W. EARLY　　　2,022,108
SOUND AND MOVING PICTURE REPRODUCING MACHINE
Filed Aug. 11, 1934　　　3 Sheets-Sheet 1
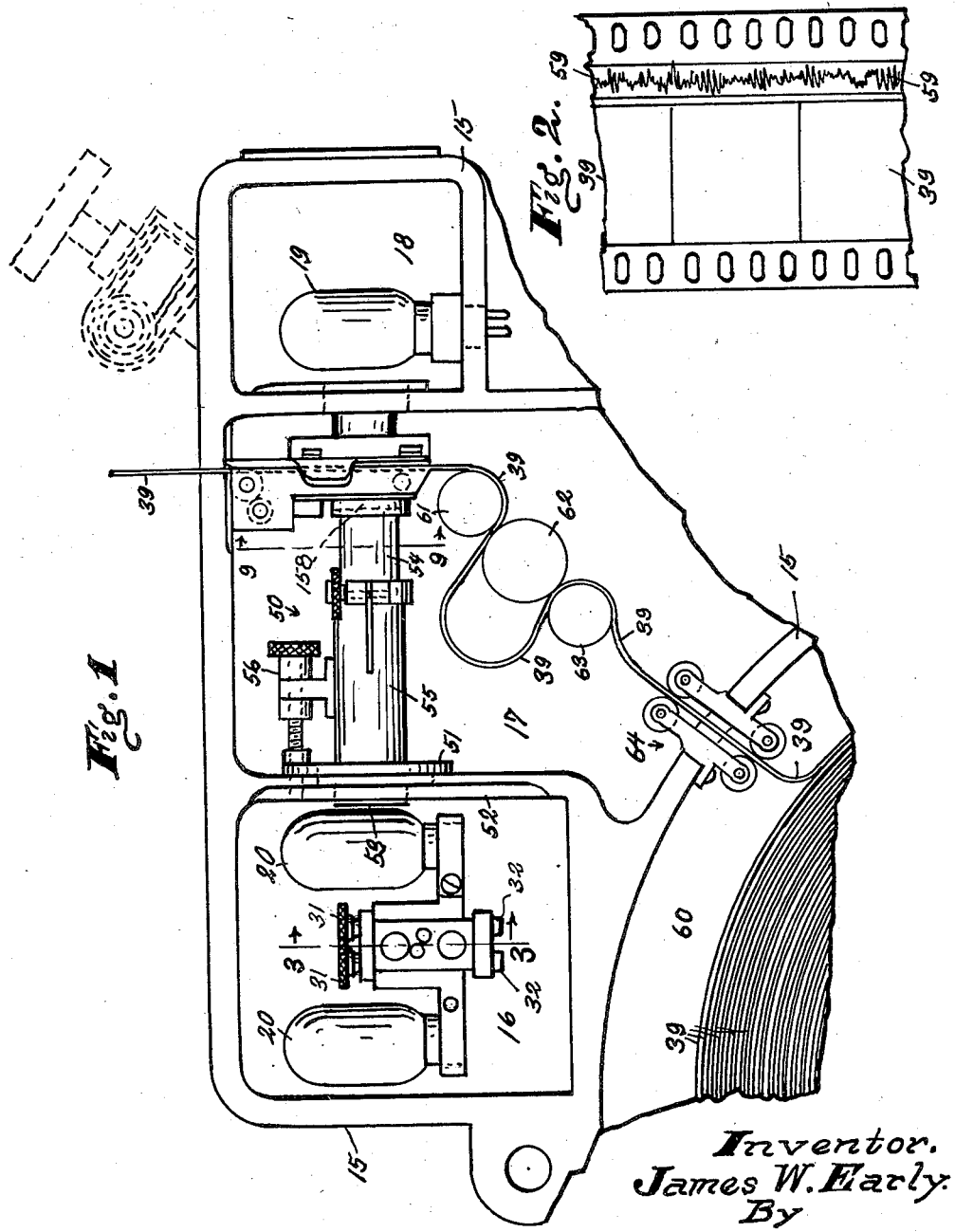
Inventor.
James W. Early.
By
William M. Gentle
His Attorney.

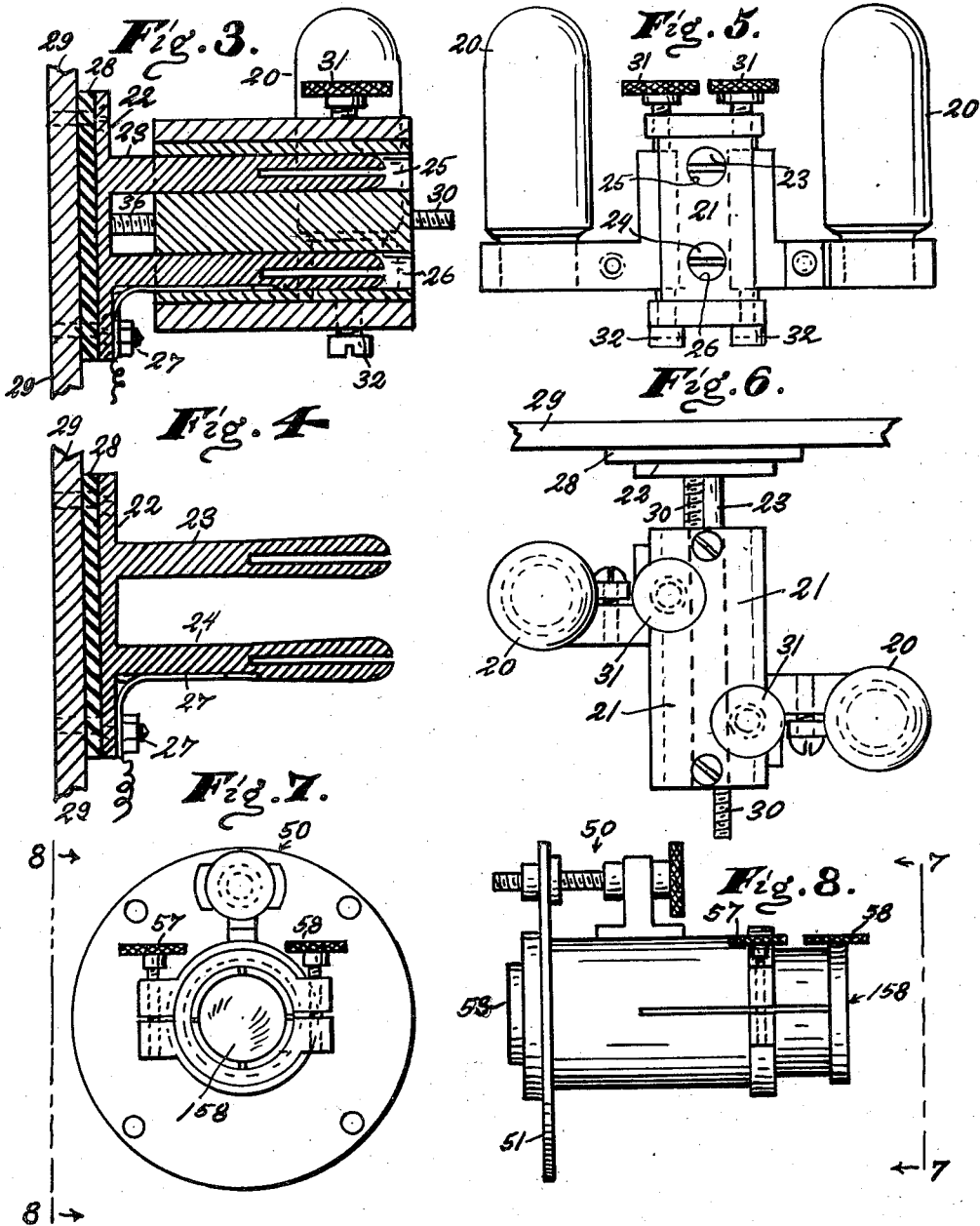

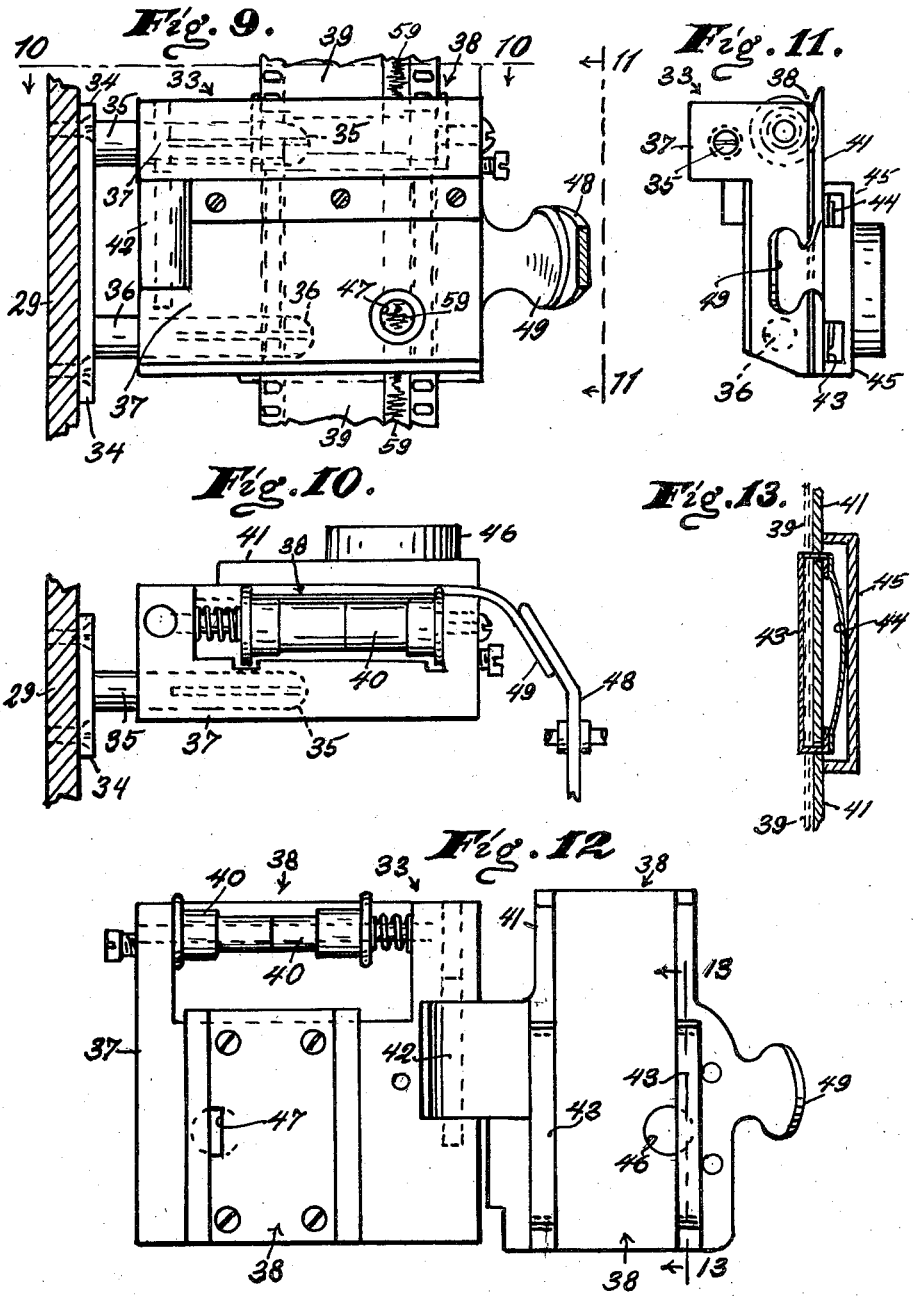

Patented Nov. 26, 1935

2,022,108

UNITED STATES PATENT OFFICE 2,022,108

SOUND AND MOVING PICTURE REPRODUCING MACHINE

James W. Early, Los Angeles, Calif., assignor, by direct and mesne assignments, to J. W. G. Curtiss, Inez M. Walcott and J. W. G. Curtiss administrator of said James W. Early, deceased Application August 11, 1934, Serial No. 739,368

8 Claims. (Cl. 179—100.3)

This invention relates to improvements in my sound and moving picture reproducing machine, application for patent for which was filed March 20, 1931, Sr. No. 524,008, and the principal object of this invention is to prevent vibration of the mechanical parts in the sound head that are associated particularly with the sound gate, exciter lamp, optical lens and photo-electric cell, all of which parts, as shown in my application for patent, coact to reproduce the sounds of an episode from a sound track.

The above mentioned mechanical devices, as shown in my prior application, while operating with great efficiency, have been greatly improved so that in addition to eliminating practically all vibrations in operation, are also highly adjustable so that absolute accurate fitting of the parts together is accomplished.

A feature of invention is shown in the construction of the exciter lamp stand whereby a rapid and accurate change from lamp to lamp is accomplished in the event that a lamp burns out while the machine is in operation.

Another feature of invention is shown in the construction and operation of the sound gate, whereby it can be quickly opened and closed for threading the moving picture film through the gate; and also it is removable for replacement or repairs in the event that any of the parts become defective.

Another feature of invention is shown in the construction and operation of the meter for properly positioning the optical lens relative to the sound track on the moving picture film and the exciter lamp; and also in the means for locking the mechanism in place after a proper adjustment is accomplished.

The accompanying drawings illustrate my invention, in which:

Figure 1 is a fragmental side view of the sound head of my improved sound and moving picture machine; and it is analogous to Fig. 4 in my prior application for United States Patent hereinbefore mentioned; in this figure, however, I semi-diagrammatically show my improvements in exciter lamp support, lens meter and film gate.

Fig. 2 in this application is analogous to Fig. 5 of the above-mentioned application, showing a fragmental portion of a moving picture film provided with a sound track.

Fig. 3 is an enlarged fragmental section on line 3—3 of Fig. 1, showing the means for detachably and reversibly supporting the exciter lamp frame.

Fig. 4 is a sectional view analogous to the lamp support shown in Fig. 3 with the lamp frame removed from the support.

Fig. 5 is a front elevation of the lamp frame with the exciter lamps thereon.

Fig. 6 is a plan view of the lamp frame and support.

Fig. 7 is an end view of the optical lens meter detached from the sound head as viewed from line 7—7, Fig. 8.

Fig. 8 is a side elevation of the meter as viewed from the line 8—8 of Fig. 7.

Fig. 9 is a fragmental sectional view as seen from the line 9—9 of Fig. 1, showing a side view of the film gate and its support and also indicating in section the end of a lever that is operated to open and close the gate, and also aid in holding it from vibration when in use.

Fig. 10 is a plan view of the gate and locking lever as viewed from the line 10—10 of Fig. 9.

Fig. 11 is an end view of the gate as viewed from the line 11—11 of Fig. 9, parts omitted for the sake of clearness in the drawings.

Fig. 12 is an inside view of the film gate detached from the head and showing it fully opened to show a guide roller for the film and showing the spring supporting guides for the film; and also showing the registering light passages through the gate, whereby the light from the exciter lamp can pass through the gate and film to the photo-electric cell when the door is closed.

Fig. 13 is a fragmental section on line 13—13 of Fig. 12, showing one of the spring-supported guides that engages the edge of the film to hold it from fluttering or vibrating as it passes through the gate.

In detail the sound head 15 includes an end chamber 16 for the exciter lamps, a center chamber 17 for the optical meter and film gate and another end chamber 18 for the photo-electric cell 19.

The exciter lamps 20 are supported on a frame 21 that is reversible on a support 22 that is secured to the rear wall of the chamber 16. This support includes two split fingers 23 and 24 that are arranged to be forcibly extended into the holes 25 and 26 in the frame 21. These holes extend entirely through the frame 21 so that it can be withdrawn from the fingers and reversed to change lamps in the event that the one in use becomes ineffective to perform its function. It is understood that only one lamp is in use at any one time and that an electric current is supplied to the lamps through the contact 27.

Preferably the support 22 is insulated by an insulating plate 28 from the rear wall of the room 16.

The fingers 23 and 24 are formed of spring metal and are also split and the parts slightly separated so the tension thereof will securely hold the frame 21 from vibration or sidewise motion when in use.

The frame 21 has adjustable end screws 30 that when they engage the support 22 hold the lamps 20 in position to perform their function. Also the frame 21 is provided with top and bottom adjustable screws 31 and 32 by which the lamps 20 are vertically adjustable.

From the foregoing it is obvious that the lamp frame can be easily and quickly pulled off of the fingers 23 and 24, reversed and replaced to change lamps when necessary; and also that the frame is adjustable endwise, and the lamps vertically to bring the lamps into exact register with the light path through the meter housed lens 158 and gate to the photo-electric cell 19.

The film gate 33 is secured to the rear wall of the chamber 17 by a support 34 that is similar to the support 22 in the chamber 16, so that the gate can be slid on and pulled off of the fingers 35 and 36 when it is to be removed or replaced.

The gate 33 includes the body 37 through which the holes for the fingers 35 and 36 are extended, and also it has the half of a vertical passage 38 for the moving picture film 39 and at the top of this half passage is a guide roller 40 over which the film runs when passing through the gate.

The hinged half of the gate 33 includes a door 41 that is hinged at 42 to the body 37, and it also has half of the vertical film-passage 38 at the sides of which are the spring-supported guides 43 that ride on the edges of the film 30 to keep it from flopping or vibrating when passing through the gate. In Fig. 13 one of the guides 43 is shown as supported by a spring 44 in the housing 45.

The door 41 has an opening 46 therethrough that is in register with the opening 47 through the body 37 when the door is closed, and the door is opened and closed by a lever 48 that is arranged to engage an extension 49 on the door 41. The lever 48 is shown semi-diagrammatically as any suitable means may be employed that prevents the door from vibrating when in operation.

The optical lens meter 50 has a disk 51 at one end thereof that is secured to a wall 52 through which the hollow cylindrical end 53 is extended into position to receive the light from the exciter lamp 20 when it is in use. The meter includes inner and outer cylindrical shells 54 and 55 with a meter screw 56 that is arranged to move the inner shell 54 with its lens 158 toward or from the opening 47 through the gate body 37; and also the shells are provided with locking screws 57 and 58, whereby the parts can be secured from sliding movement when in operation.

The film 39 is provided with a sound track 59 that, when passing through the film gate 33, is in register with the openings 46 and 47 so that light from the exciter lamp 20 can pass through the meter lens 158, gate 33 and film 39 to the photo-electric cell 19, as previously described.

As diagrammatically indicated in Fig. 1, the film 39, after passing from the gate 33, is carried to the take-up magazine 60 by means of the guide rollers 61, 62, and 63 and fire-gate 64.

As constructed, arranged and described, these improved parts positively prevent vibration or out-of-focus movements thereof, whereby very efficient reproduction of sound is accomplished; and also the machine is much easier to care for and operate, in addition to which these parts are much easier to construct and assemble or replace if broken or out of order.

The machine is operated as hereinbefore fully and clearly described.

I claim as my invention:

1. In a sound and moving picture reproducing machine, the combination with a sound head having a center and end chambers therein, a support in one of said end chambers, split fingers on said support, a lamp frame having holes therethrough into which said fingers can be extended to frictionally hold and support said frame, exciter lamps on said frame, a photo-electric cell in said sound head, a film gate interposed between said lamps and photo electric cell and having a passage therethrough that is in focus with one of said lamps and photo electric cell, and means whereby said frame can be reversed to move one of said lamps into and the other out of focus with the light passage through said film gate to said photo-electric cell.

2. In a sound and moving picture reproducing machine the combination with a sound head having a center and end chambers therein, a support in one of said end chambers, split fingers on said support, a reversible lamp frame having holes therethrough into which said fingers can be extended to frictionally hold and support said frame, exciter lamps on said frame, a photo-electric cell in said sound head, a film gate interposed between said lamps and photo electric cell and having a passage therethrough that is in focus with one of said lamps and photo-electric cell, top and bottom screws for adjusting said lamps vertically, and end screws for limiting the endwise movement of said lamp frame to stop one of said lamps thereon in focus with the light passage through said gate.

3. In a sound and moving picture reproducing machine the combination with a sound head having a center and end chambers therein, a support in one of said end chambers, split fingers on said support, a lamp frame having holes therethrough into which said fingers can be extended to frictionally hold and support said frame, exciter lamps on said frame, means for adjusting said lamps vertically, other means for adjusting said lamp frame horizontally to move said lamps into a focusing position, a moving picture film gate in said center chamber, a photo-electric cell in said other end chamber, and means for passing the light from said exciter lamp through said gate to said cell.

4. In a sound and moving picture reproducing machine, the combination with a sound head having center and end chambers therein, a support in said center chambers, split fingers on said support, a film gate having holes therein so it can be forced into said fingers, said gate having a vertical passage therethrough for a film and a horizontal passage for light, a moving picture film having a sound-track thereon arranged to pass through said gate so its sound track will be in register with the light passage through said gate, an exciter lamp in one of said end chambers, a photo-electric cell in the other end chamber, and means whereby the light from said lamp can pass through said gate and film track to said cell.

5. In a sound and moving picture reproducing machine, the combination with a sound head having a center and end chambers therein, a support in said center chambers, split fingers on said support, a removable film gate having holes therein so it can be forced onto said fingers, said gate having a vertical passage therethrough for a film and a horizontal passage for light, a moving picture film having a sound-track thereon arranged to pass through said gate so its sound track will be in register with the light passage through said gate, a hinged door to said gate that can be opened and closed when said gate is removed from said fingers, an exciter lamp in one of said end chambers, a photo-electric cell in the other end chamber, and means whereby the light from said lamp can pass through said gate and film track to said cell.

6. In a sound and moving picture reproducing machine, the combination with a sound head having a center and end chambers therein, a support in said center chambers, split fingers on said support, a film gate having holes therein so it can be forced onto said fingers, said gate having a vertical passage therethrough for a film and a horizontal passage for light, a moving picture film having a sound-track thereon arranged to pass through said gate so its sound track will be in register with the light passage through said gate, an exciter lamp in one of said end chambers, a photo-electric cell in the other end chamber, means whereby the light from said lamp can pass through said gate and film track to said cell, and spring-pressed film guides on said door for preventing said moving picture film from vibrating when passing through said gate.

7. In a sound and moving picture reproducing machine, the combination with a sound head having center and end chambers therein, a support in said center chambers, split fingers on said support, a film gate having holes therein so it can be forced onto said fingers, said gate having a vertical passage therethrough for a film and a horizontal passage for light, a moving picture film having a sound-track thereon arranged to pass through said gate so its sound track will be in register with the light passage through said gate, an exciter lamp in one of said end chambers, a photo-electric cell in the other end chamber, means whereby the light from said lamp can pass through said gate and film track to said cell, a guide roller on said gate, and spring-pressed film guides on said door arranged in said vertical passage for preventing said moving picture film from vibrating when passing through said gate.

8. In a sound and moving picture reproducing machine, the combination with a sound head having center and end chambers therein, a support in said center chambers, split fingers on said support, a film gate having holes therein so it can be forced onto said fingers, said gate having a vertical passage therethrough for a film and a horizontal passage for light, a moving picture film having a sound-track thereon arranged to pass through said gate so its sound track will be in register with the light passage through said gate, an exciter lamp in one of said end chambers, a photo-electric cell in the other end chamber, means whereby the light from said lamp can pass through said gate and film track to said cell, a guide roller on said gate, spring-pressed film guides on said door arranged in said vertical passage for preventing said moving picture film from vibrating when passing through said gate, and a lever for engaging said door to hold it closed and to aid in preventing vibration of said gate when in use.

JAMES W. EARLY.